US 6,592,242 B1

(12) United States Patent
Scaccia (10) Patent No.: US 6,592,242 B1
(45) Date of Patent: Jul. 15, 2003

(54) AUXILIARY LIGHTS FOR A MOTORCYCLE (76) Inventor: Brian C. Scaccia, 15052 Redhill Ave., No. C, Tustin, CA (US) 92780

( * ) Notice: Subject to any disclaimer, the term of this patent is extended or adjusted under 35 U.S.C. 154(b) by 0 days.

(21) Appl. No.: 10/108,933

(22) Filed: Mar. 29, 2002

(51) Int. Cl.[7] .............................................. F21V 33/00
(52) U.S. Cl. ...................... 362/473; 362/543; 362/495
(58) Field of Search ................................. 362/473, 543, 362/495; 340/468, 472, 488

(56) References Cited

U.S. PATENT DOCUMENTS

| 4,355,838 A | * | 10/1982 | Hickman | 296/78.1 |
| 4,461,508 A | * | 7/1984 | Ogishima | 296/78.1 |
| 4,515,405 A | * | 5/1985 | Ogishima | 296/78.1 |
| 4,686,656 A | * | 8/1987 | Morishima | 362/473 |
| 4,797,791 A | * | 1/1989 | Burchick | 362/473 |
| 6,398,393 B1 | * | 6/2002 | Perse | 362/473 |

FOREIGN PATENT DOCUMENTS

JP         406227314 A  *  8/1994

* cited by examiner

Primary Examiner—Sandra O'Shea
Assistant Examiner—Hargobind S. Sawhney
(74) Attorney, Agent, or Firm—Morland C. Fischer (57) ABSTRACT A pair of auxiliary lights to be conveniently and unobtrusively carried at the opposite sides of a motorcycle in order to cooperate with the standard front headlamp and thereby advantageously provide the operator with a wide field of view including both frontal and lateral illumination so as to be better able to see approaching objects and landmarks and have sufficient time to react thereto. Each auxiliary light includes a housing, a light bulb enclosed by the housing and a foot peg bracket detachably connected to one side of the housing at which to receive a corresponding one of the left or right foot pegs of the motorcycle. A shifter mount bracket is detachably connected to the opposite side of the housing of one of the pair of auxiliary lights, and the gear shift pedal of the motorcycle is coupled to the shifter mount bracket of the one of the pair of auxiliary lights.

14 Claims, 7 Drawing Sheets

AUXILIARY LIGHTS FOR A MOTORCYCLE

BACKGROUND OF THE INVENTION

1. Field of the Invention

This invention relates to a pair of auxiliary lights to be conveniently and unobtrusively carried at the opposite sides of a motorcycle in order to cooperate with the standard front headlamp and thereby advantageously provide the operator with a wider field of view including both frontal and lateral illumination so as to be able to better see approaching objects and landmarks.

2. Background Art

A conventional motorcycle is usually provided with a single headlamp that is mounted at the front of the vehicle. Therefore, light is directed entirely ahead of the operator which results in a limited field of view. That is, the standard front headlamp offers little, if any, side illumination. Consequently, the operator will be unable to gain the benefit of an early visualization of certain approaching objects and landmarks that are located along the sides of the roadway. Once the object and/or landmark is finally illuminated by the front headlamp, there may be little time remaining for the operator to properly react as would be required under the circumstances. Such a reduced field of view and correspondingly reduced reaction time on especially dark nights can increase safety risks for both the operator as well as approaching pedestrians and vehicles. Moreover, it is sometimes difficult for such approaching pedestrians and vehicles to clearly see the motorcycle, especially during foggy conditions. What is even more, the operator may altogether miss or be unable to read signs or other markers along the roadway which offer directions or provide indications of the oncoming terrain.

Reference may be made to U.S. Pat. No. 4,686,656 to Kazuo Morishima for an example of a supplementary light source for a motorcycle.

SUMMARY OF THE INVENTION

In general terms, disclosed below is a pair of right and left auxiliary lights that are connected to the existing framework of a motorcycle so as to cooperate with the standard front headlamp thereof to provide the operator with an expanded field of view including both lateral and frontal illumination, whereby the operator will now be better able to see approaching individuals and landmarks along the roadway so as to have more time to react thereto. The pair of auxiliary lights are adapted to be easily and conveniently mounted at opposite sides of the motorcycle, regardless of manufacturer.

Each of the auxiliary lights includes a metallic housing to enclose a halogen style bulb, or the like. A detachable foot peg bracket is attached to a first side of the housing, and one foot peg of the motorcycle is pivotally connected to the foot peg bracket between a pair of spaced, diagonally extending flanges thereof. A first row of fasteners runs along the first side of the housing. Therefore, the foot peg bracket to which the foot peg is pivotally connected can be easily detached from and reattached to any position along the first side of the housing depending upon the motorcycle. A pair of the first row of fasteners running along the first side of the housing are relatively long to assure a reliable connection of the detachable foot peg bracket to the housing of each of the pair of auxiliary lights. By virtue of its pivotal connection to the foot peg bracket, each foot peg may be rotated to an out of the way position at which to enable the motorcycle to be laid flat on its side against the ground.

A second side of the housing of one (i.e. the left) of the pair of auxiliary lights has a second row of fasteners running therealong. A detachable shift mount bracket is attached to the second side of the housing by means of a pair of relatively long fasteners from the second row thereof. Therefore, the shifter mount bracket can be easily detached from and reattached to any position along the second side of the housing depending upon the motorcycle. The motorcycle shift pedal is connected to the motorcycle shift rod via a coupling of the shift arm to the gear box linkage at a (e.g. needle) bearing formed through the detachable shifter mount bracket at the second side of the housing.

DESCRIPTION OF THE PREFERRED EMBODIMENT

Figure 1:
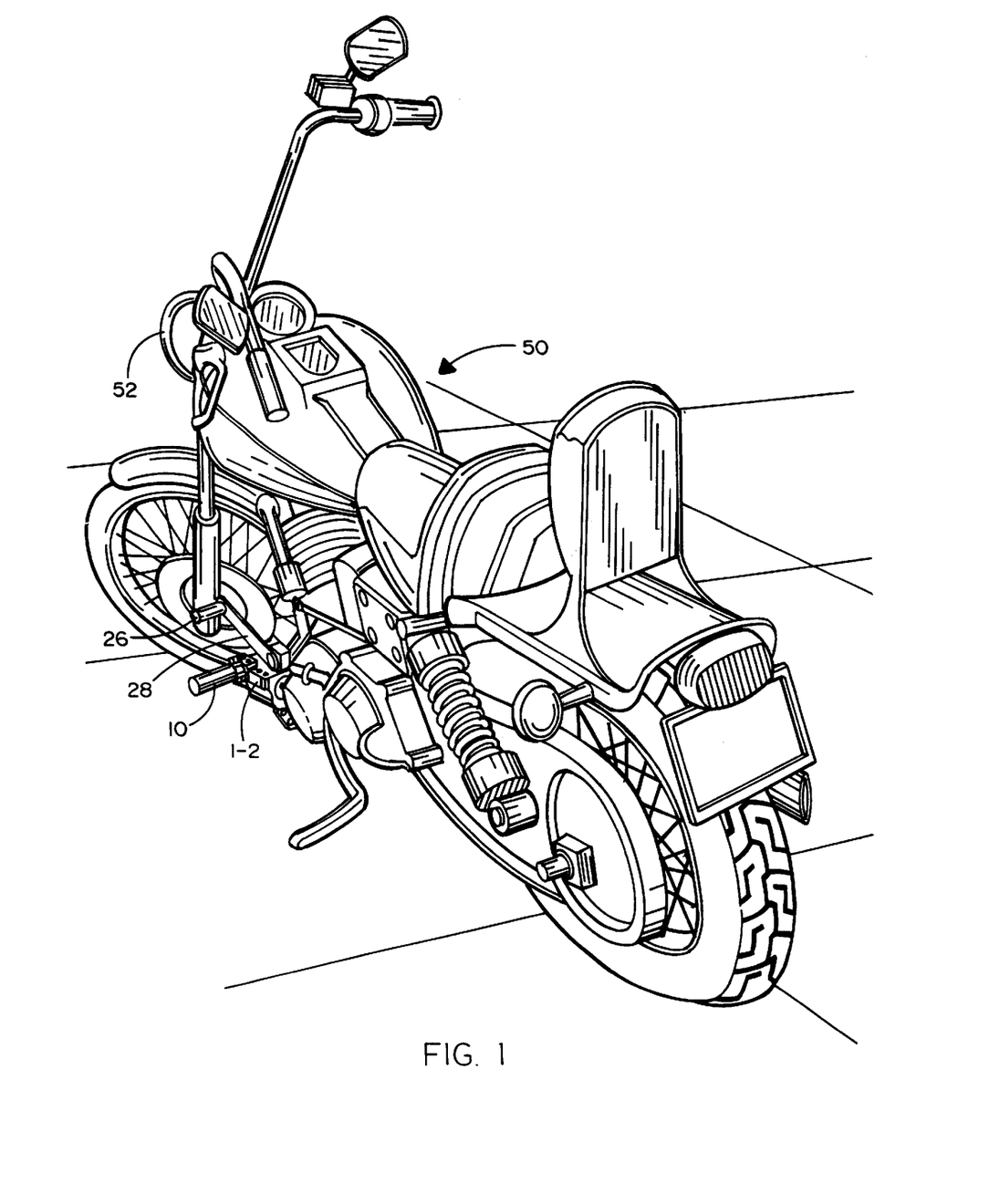
FIG. 1 shows a motorcycle with the pair of auxiliary lights which form the present invention mounted at opposite sides thereof.
Figure 2:
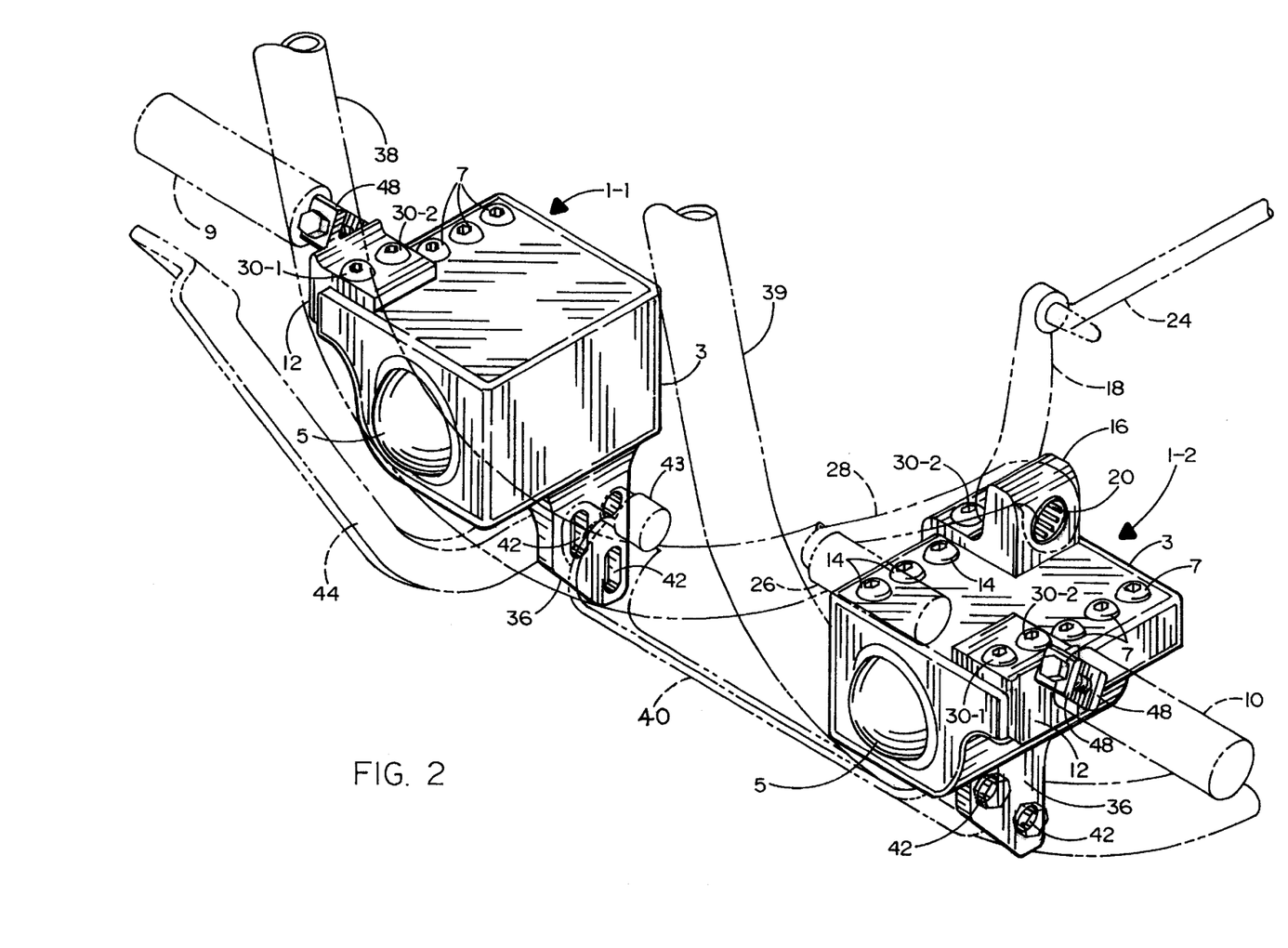
FIG. 2 shows the pair of auxiliary lights of FIG. 1 connected to the existing framework of the motorcycle.

FIG. 1 of the drawings shows a motorcycle 50 of the kind to which the pair of auxiliary lights (only one of which 1-2 being visible) of this invention may be attached. While the motorcycle 50 may be recognized as being manufactured from Harley-Davidson, it is to be understood that the auxiliary lights disclosed below are not limited to any particular motorcycle or manufacturer. In this regard, and as will be explained in greater detail, while the motorcycle 50 includes the usual front head lamp 52, the pair of auxiliary lights are particularly positioned at opposite sides of the motorcycle to provide an expanded field of view to the operator (best illustrated in FIG. 14). Moreover, and as will also soon be explained, the auxiliary lights may be reliably and unobtrusively attached without making any significant modifications to the framework of the motorcycle 50.

Turning now to FIGS. 2–5 of the drawings, there is shown right and left auxiliary lights 1-1 and 1-2 to be attached to the opposite sides of the motorcycle 50 of FIG. 1. Each of the right and left lights 1-1 and 1-2 includes a housing 3 which is preferably manufactured from polished aluminum. Each of the right and left headlamps 1-1 and 1-2 also preferably includes a halogen style light bulb (designated 34 in FIG. 3) and a convex lens 5 enclosed by the housing 3 to provide an intensely illuminated area for the operator of the motorcycle 50.

Each of the housings 3 includes a first row of removable fasteners (e.g. button head bolts) 7 running along a first side thereof. The right foot peg 9 of motorcycle 50 is connected to the first side of the housing 3 of the right auxiliary light 1-1 by means of a detachable foot peg bracket 12. The left foot peg 10 of motorcycle 50 is connected to a first side of the housing 3 of the left auxiliary lamp 1-2 by means of an identical detachable foot peg bracket 12. A pair of fasteners 7 are used to secure each foot peg bracket 12 to the first side of its respective housing 3. However, by virtue of the fact that the fasteners 7 are removable, the location of the detachable foot peg brackets 12 along the first sides of the housings 3 of lights 1-1 and 1-2 may be selectively changed depending upon the motorcycle and the particular pair of fasteners 7 from the row of fasteners which are used attach foot peg brackets 12 to housings 3.

Figure 11:
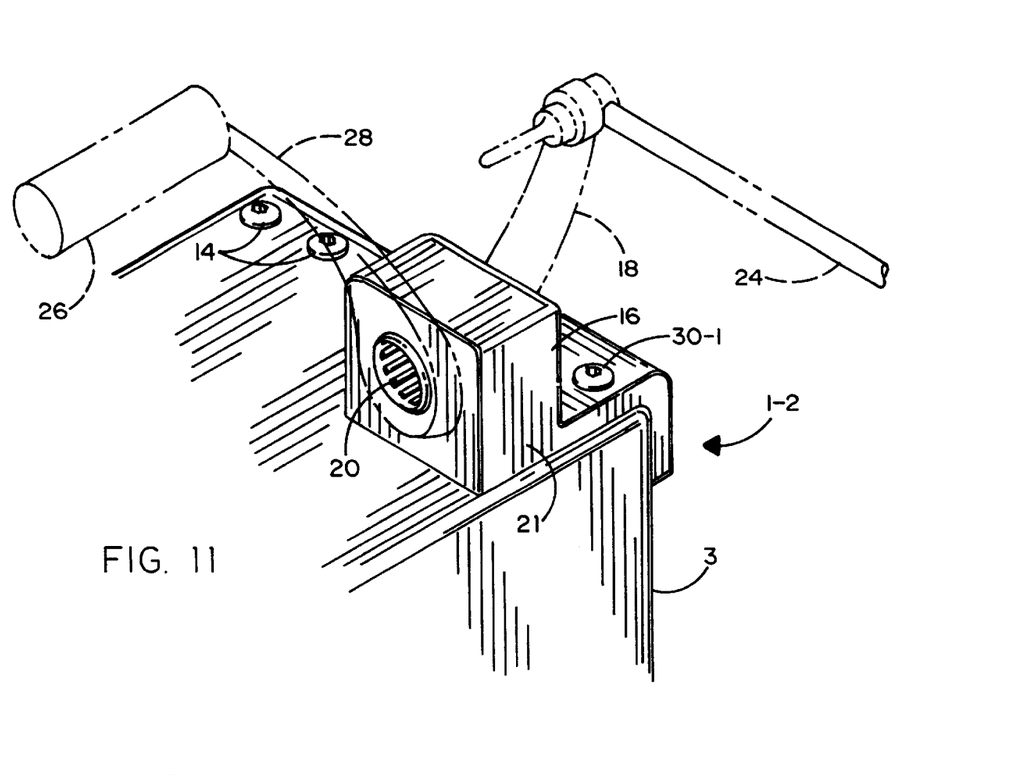
FIG. 11 shows the coupling connection of the motorcycle shift pedal to the motorcycle shift rod by way of a needle bearing formed through the shifter mount bracket.
Figure 12:
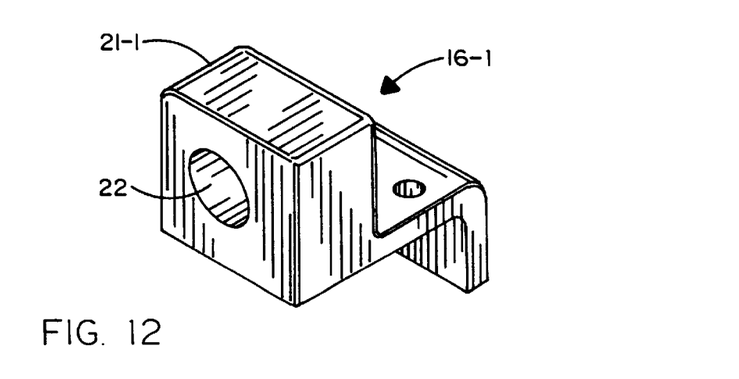
FIG. 12 shows an alternate shifter mount bracket having a clear bore.

In the case of the left auxiliary light 1-2, a second row of removable fasteners 14 runs along the second side of the housing 3 opposite the first row of fasteners 7. A generally Z-shaped shifter mount bracket 16 of motorcycle 50 (best shown in FIG. 11) is detachably connected to the second side of housing 3 of the left auxiliary light 1-2. The gear box linkage 18 of motorcycle 50 is coupled to the housing 3 of light 1-2 by means of the shifter mount bracket 16. For the type of motorcycle 50 illustrated in FIG. 1, the gear box linkage 18 is coupled to two sets of needle bearings 20 formed through a base 21 (of FIG. 11) in the Z-shaped shifter mount bracket 16. However, and is best shown at FIG. 12 of the drawings, the shifter mount bracket (designated 16-1) may also have a smooth bore 22 formed through its base 21-1 (rather than the needle bearings 20 of FIG. 11) to which the gear box linkage 18 is coupled. The gear box linkage 18 is also coupled to the gear box (not shown) of the motorcycle 50 by way of a shift rod 24.

The shift pedal 26 of motorcycle 50 is connected to a shift arm 28. The shift arm 28 is coupled to the shifter mount bracket 16 at the needle bearings 20 thereof. Accordingly, and as is best shown in FIG. 11, the shift pedal 26 of motorcycle 50 is linked to the shift rod 24 by means of the coupling connection of shift arm 28 to gear box linkage 18 through the needle bearings 20 of the shifter mount bracket 16 that is detachably connected to the housing 3 of the left auxiliary light 1-2.

Like the detachable foot peg bracket 12, a pair of the second now of fasteners 14 are used to secure the shifter mount bracket 16 to the second side of the housing 3 of the left auxiliary light 1-2. By virtue of the removable nature of fasteners 14, the location of the detachable shifter mount bracket 16 along the second side of housing 3 may be selectively changed depending upon the motorcycle and the particular pair of fasteners 14 from the second row of fasteners which are used to attach bracket 16.

Figure 10:
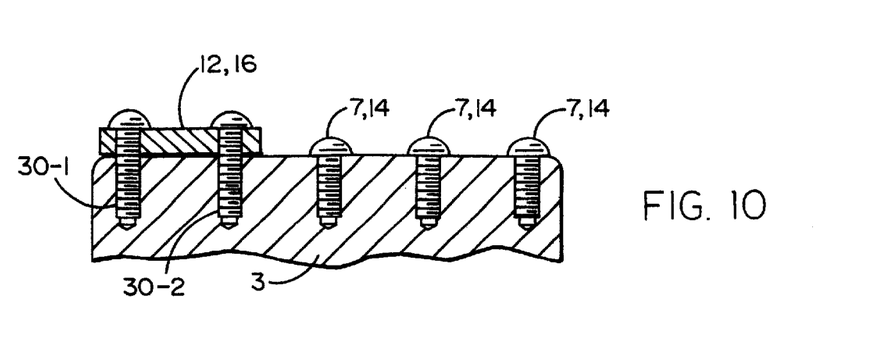
FIG. 10 shows a pair of elongated fasteners for detachably connecting either one of the foot peg bracket or the shifter mount bracket at opposite sides of the auxiliary light of FIGS. 3–5.

Referring briefly to FIG. 10 of the drawings, a row of removable fasteners 7 or 14 is shown for detachably connecting either one of the foot peg bracket 12 or the shifter mount bracket 16 to the opposite sides of the housing 3 of an auxiliary headlamp 1-1 or 1-2. In as much as a pair of fasteners 7 or 14 is used to secure each bracket 12 or 14 to its housing 3, two of the fasteners 30-1 and 30-2 are longer than the remaining fasteners 7 and 14. A longer length is desirable to ensure that the pair of fasteners 30-1 and 30-2 will fully extend through the brackets 12 and 16 for receipt by housings 3. Moreover, the longer fasteners 30-1 and 30-2 will remind the motorcycle operator that the positions of the foot peg bracket 12 and shifter mount bracket 16 are selectively adjustable along the opposite sides of the housings 3 to be better able to accommodate the right and left foot pegs 9 and 10 and the shift pedal 26 of the motorcycle.

Figure 3:
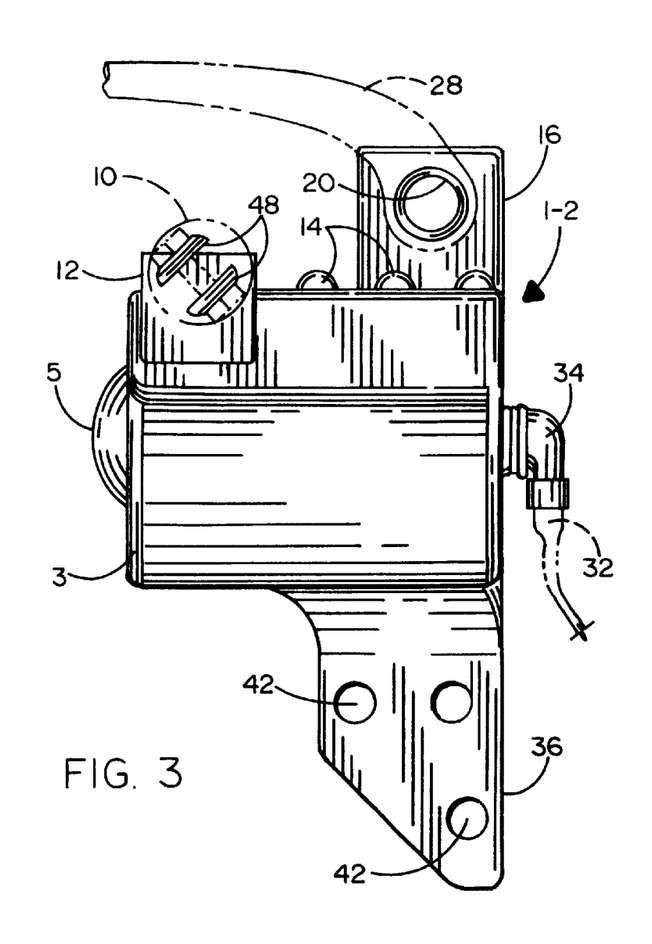
FIG. 3 is a side view of one of the auxiliary lights of FIG. 2 having a foot peg bracket and a shifter mount bracket detachably connected at opposite sides thereof.
Figure 4:
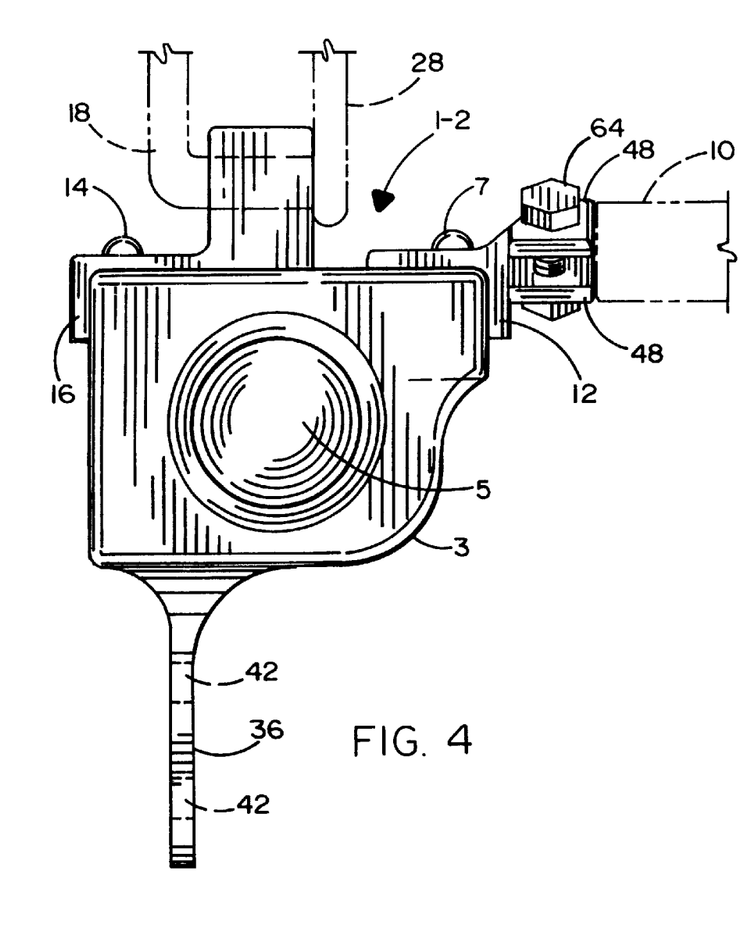
FIG. 4 is a front view of the auxiliary light of FIG. 3.
Figure 5:
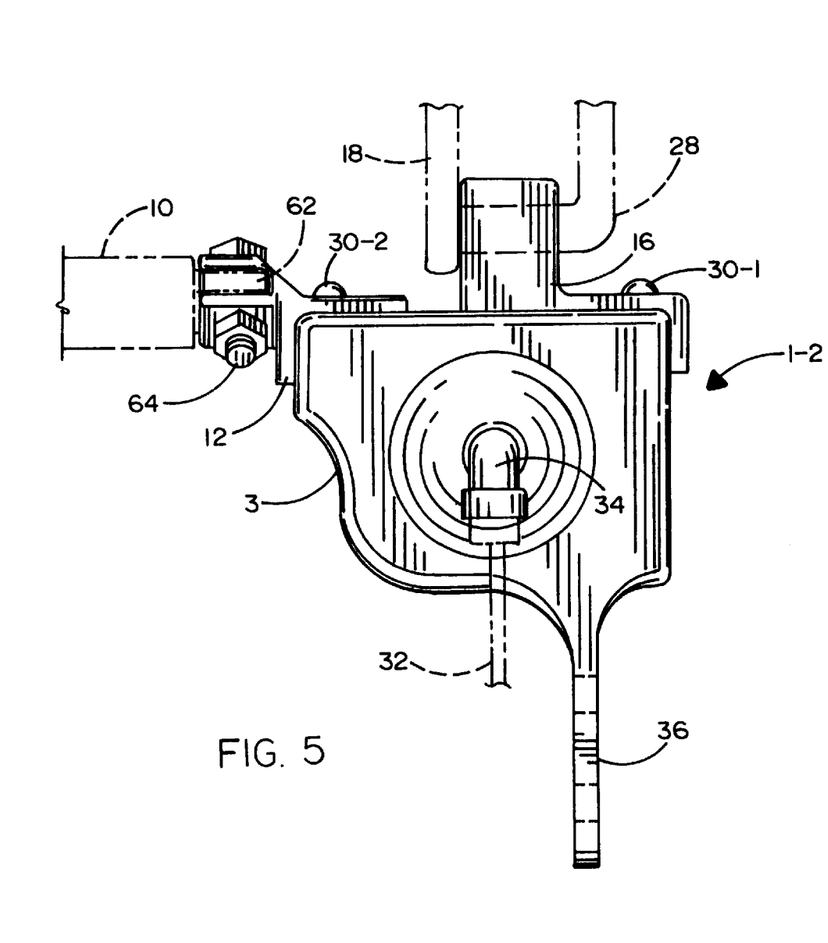
FIG. 5 is a rear view of the auxiliary light of FIG. 3.

As is best shown in FIG. 3, electrical wiring 32 is attached to the halogen light bulb 34 of each housing 3 of the right and left auxiliary lights 1-1 and 1-2 to provide power from the battery of the motorcycle of the light bulb. A removable cover at the rear of housing 3 surrounds light bulb 34 and seals out moisture and road debris. As also best shown in FIGS. 3–5, a mounting flange 36 depends downwardly from the bottom of each of the housings 3. The mounting flanges 36 permit the auxiliary lights 1-1 and 1-2 to be supported by the existing framework of the motorcycle 50. In this regard, located at the front of the motorcycle 50 is a pair of generally vertical metal tubes (designated 38 and 39 in FIG. 2) by which to support the motorcycle motor. A metal cross bar 40 typically extends horizontally between tubes 38 and 39.

The downward depending mounting flanges 36 of auxiliary lights 1-1 and 1-2 include one or more openings 42 formed therein through which to receive suitable fasteners so that flanges 36 can be connected to rises (not shown) welded to the vertical tubes 38 and 39 of the framework. The openings 42 may be either round or elliptical to permit the positions of the fasteners through openings 42 in flanges 36 to be adjusted relative to the tubes 38 and 39. To help space the flange 36 of the housing 3 of right headlamp 1-1 from the brake pedal arm 44 of the motorcycle 50, a brake pedal shoulder bolt 43 is received through a corresponding hole formed in flange 36. It may be necessary to adjust the position of the housings 3 by means of elliptical openings 42 formed in the flanges 36 depending upon the manufacturer of the motorcycle and the construction of the original framework so as to prevent the convex lenses 5 of auxiliary lights 1-1 and 1-2 from being blocked.

Figure 6:
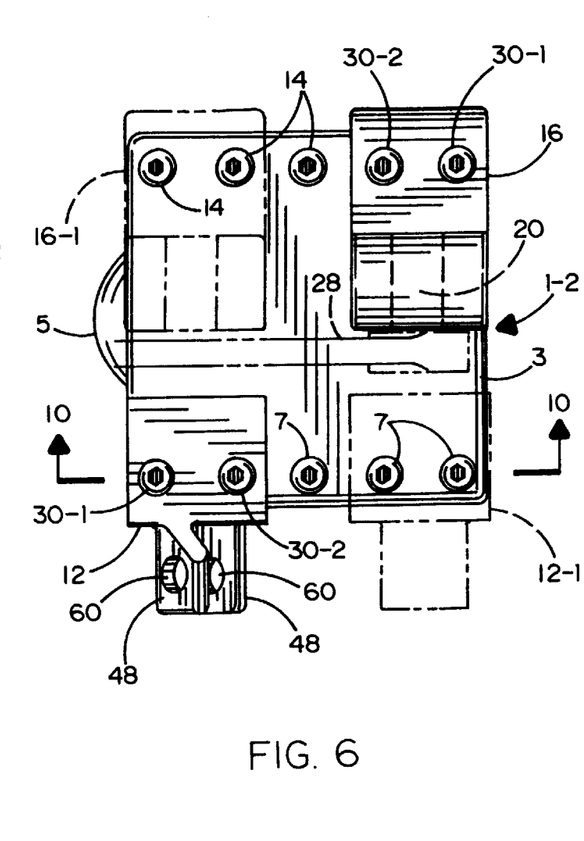
FIG. 6 shows the auxiliary light of FIGS. 3–5 to illustrate the detachable nature of the foot peg bracket and the shifter mount bracket thereof.

Turning to FIG. 6 of the drawings, details are shown to illustrate the detachable nature of the foot peg brackets 12 and the shifter mount bracket 16 to the housings 3 of the right and left auxiliary lights 1-1 and 1-2. FIG. 6 shows a detachable foot peg bracket 12 attached to the first side and at one end of the housing 3 of the left light 1-2. As was previously described when referring to FIG. 10, a pair of long fasteners 30-1 and 30-2 (relative to the length of the remaining fasteners 7) are used to secure the foot peg bracket to housing 3. However, as was also described, the position of the foot peg bracket 12 along the first side of housing 3 is adjustable according to the motorcycle and its manufacturer. Therefore, the fasteners 30-1 and 30-2 can be removed to permit the foot peg bracket (shown in phantom lines and represented by reference numeral 12-1) to be detached from one end and reattached at the opposite end of the housing 3. Of course, the foot peg bracket 12 can also be attached to housing 3 at any other position along the first side thereof to facilitate the connection of the left auxiliary light 1-2 to motorcycle 50.

FIG. 6 also shows the detachable shift mount bracket 16 attached to the second side and at one end of the housing 3 of left headlamp 1-2. As was previously described when referring to FIG. 10, another pair of long fasteners 30-1 and 30-2 (relative to the length of the remaining fasteners 14) are used to secure the detachable shift mount bracket 16 to housing 3. However, and as was also described, the position of the shift mount bracket 16 along the second side of housing 3 is adjustable according to the motorcycle and its manufacturer. Therefore, the fasteners 30-1 and 30-2 can be removed to permit the shift mount bracket (shown in phantom lines and represented by reference numeral 16-1) to be detached from one end and reattached to the opposite end of housing 3. The shifter mount bracket 16 can also be attached to housing 3 at any other position along the second side thereof to facilitate the connection of the left auxiliary light 1-2 to motorcycle 50.

Figure 7:
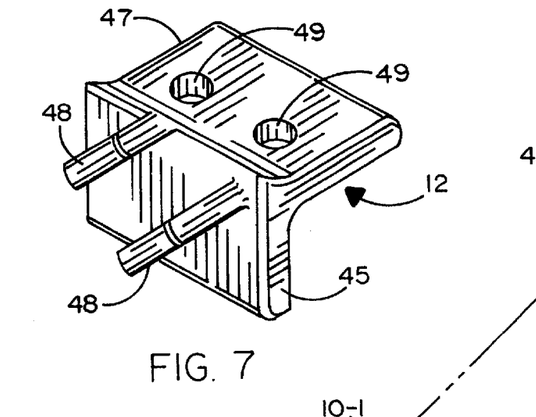
FIGS. 7 and 8 illustrate details of the detachable foot peg bracket.
Figure 8:
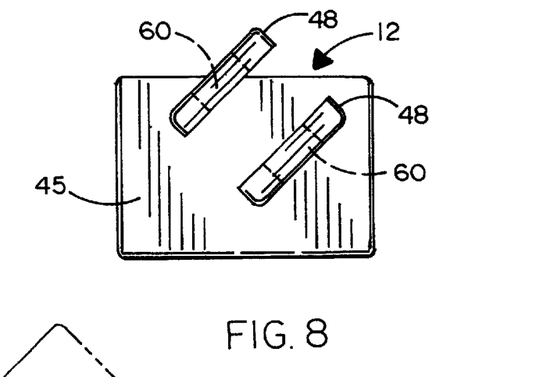

Details of the detachable foot peg brackets 16 for connecting the right and left foot pegs (designated 9 and 10 in FIG. 2) of the motorcycle 50 to the housings 3 of the right and left auxiliary lights 1-1 and 1-2 are illustrated in FIGS. 7 and 8 of the drawings. Each of the foot peg brackets 12 has a generally L-shape and includes a back portion 45 coextensively connected to a head portion 47. A pair of spaced, parallel aligned flanges 48 project outwardly from the back portion 45 of foot peg bracket 12, and a pair of screw holes 49 are formed through the head portion 47 thereof to receive respective fasteners 30-1 and 30-2. A bolt hole 60 (best shown in FIGS. 8) is formed through each flange 48.

Figure 9:
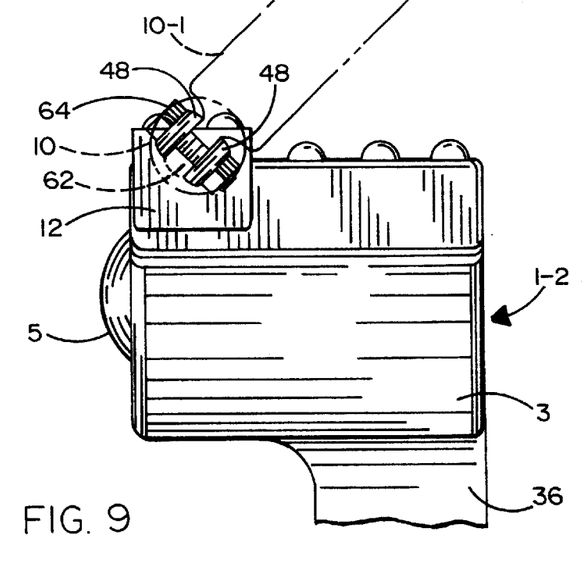
FIG. 9 shows details of a motorcycle foot peg pivotally connected to the detachable foot peg bracket of FIGS. 7 and 8.

The pair of parallel aligned flanges 48 extend diagonally across the back portion 45 of each foot peg bracket 12. Flanges 48 are spaced from one another so as to accommodate the mounting extension 62 of one of the foot pegs (e.g. the left foot peg 10) in the manner shown in FIG. 9. A suitable fastener 64 (of FIG. 9) extends through the bolt holes 60 and between the pair of flanges 48 so as to pivotally connect the mounting extension 62 of foot peg 10 to the foot peg bracket 12 that is detachably connected to and movable along the first side of the housing 3 of left auxiliary headlamp 1-2.

By virtue of the pivotal connection of the mounting extension 62 of the foot peg 10 to foot peg bracket 12 between the pair of spaced, diagonally extending flanges 48, the foot peg 10 can be rotated relative to auxiliary light 1-2. The same advantage will also be available to the right foot peg 9 (of FIG. 2) that is connected to the housing 3 of the right auxiliary light 1-1 by means of its respective foot peg bracket 12. More particularly, it may be necessary to change (i.e. rotate) the position of the foot peg 10 through a 90 degree arc (as shown in phantom lines and designated by reference numeral 10-1 in FIG. 9) to enable the motorcycle 50 to lie down on its side. That is to say, the pivotal connection of the foot peg mounting extension 62 to the fastener 64 between the diagonally disposed flanges 48 of foot peg bracket 12 allows the foot peg to swing out of the way and, thereby, permit the operator to lay his motorcycle flat on the ground.

In this same regard, it may be appreciated that the right and left foot pegs 9 and 10 can be displaced in two different direction to enhance the non-obtrusive nature of the right and left auxiliary lights 1-1 and 1-2 that are connected to and carried at the opposite sides of by the motorcycle 50. In other words, the detachable foot peg brackets 12 to which the foot pegs 9 and 10 are connected can be conveniently positioned and repositioned (by means of a pair of relatively long fasteners 30-1 and 30-2) along the first side of the housings 3 of lights 1-1 and 1-2. As was just described above, the foot pegs 9 and 10 may also be rotated relative to their respective lights 1-1 and 1-2 so as not to interfere with the ability of the motorcycle 50 to be laid flat against the ground.

Figure 13:
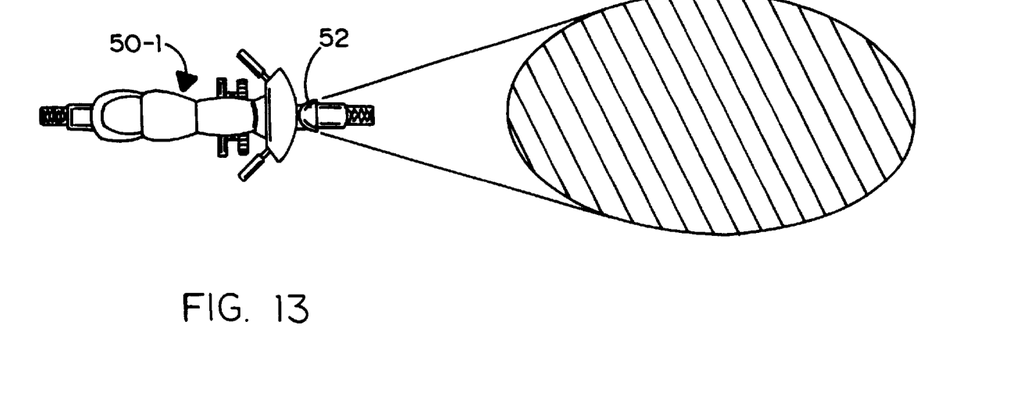
FIG. 13 shows the standard light pattern that is available to a motorcycle having the usual single front headlamp.
Figure 14:
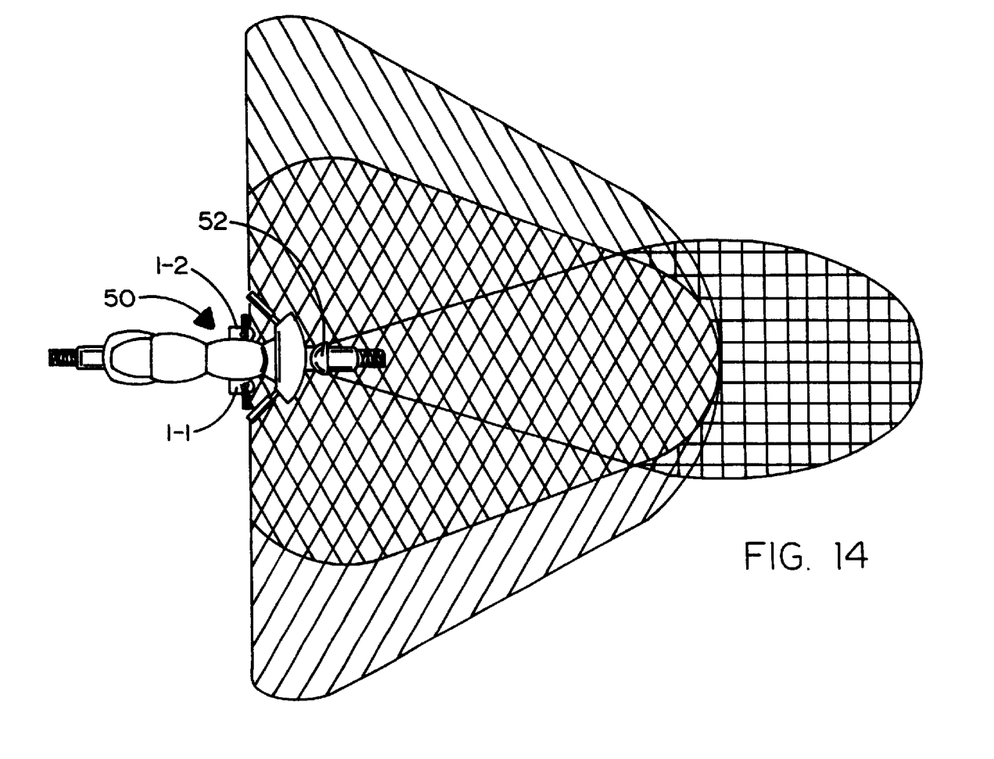
FIG. 14 shows the expanded light pattern that is available to the motorcycle of FIG. 1 when the front headlamp is used in combination with the pair of auxiliary side lights which form the present invention.

FIG. 13 of the drawings shows the standard light pattern that is provided by a conventional motorcycle 50-1 having only a single front headlamp 52-1. In this case, the light is directed entirely ahead of the operator, and no lateral illumination is provided. FIG. 14 of the drawings shows the improved light pattern for the motorcycle 50 (of FIG. 1) when the illumination provided by the usual front headlamp 52 is combined with the illumination of the right and left auxiliary sidelights 1-1 and 1-2 of this invention. In this case, the operator is advantageously provided with a wider field of view including both frontal and lateral illumination so as to be better able to see approaching individuals and landmarks along the road which might otherwise not be visible, particularly at night. This increased field of view will allow the operator to be better able to detect his surroundings and have more time to react to changes in the terrain and approaching obstacles, whereby to maximize safety for himself and oncoming vehicles and pedestrians. Because of the triangular (front and opposite sides) light pattern, oncoming motorists are likely to recognize the approaching motorcycle 50 so that they will not be inclined to swerve off the road to the shoulder which may result in an accident. In this same regard, vehicles approaching from the rear will be better able to detect the motorcycle 50 by virtue of the broad pattern of light that is produced thereby. This broad light pattern is a vast improvement over the usual small red tail light at the rear of the motorcycle and the small illumination pattern at the front.

I claim:

1. For a motorcycle having a front end, opposite sides, left and right foot pegs located at said opposite sides and a gear shift pedal located at one of said opposite sides, the improvement comprising a pair of auxiliary lights respectively connected to the opposite sides of said motorcycle to provide the motorcycle with a source of lateral illumination, each of said pair of auxiliary lights including a housing, a light bulb enclosed by said housing and a foot peg bracket connected to said housing, said motorcycle foot peg bracket coupled to one of said left and right foot pegs, whereby the one of said foot pegs is supported by said housing.

2. The pair of auxiliary lights recited in claim 1, wherein said foot peg bracket is detachably connected at a side of said housing.

3. The pair of auxiliary lights recited in claim 2, also including a row of fasteners located along the side of said housing, said foot peg bracket being detachably connected at the side of said housing by means of at least one fastener from said row of fasteners, such that the position of said foot peg bracket along the side of said housing is selectively adjustable depending upon the particular fastener from said row of fasteners to detachably connect said foot peg bracket to said housing.

4. The pair of auxiliary lights recited in claim 3, wherein said at least one fastener from said row of fasteners by which said foot peg bracket is detachably connected at the side of said housing is longer than the other fasteners from said row of fasteners.

5. The pair of auxiliary lights recited in claim 1, wherein said foot peg bracket includes a flange projecting outwardly therefrom, the one of said left and right foot pegs being pivotally connected to said foot peg bracket at said flange, whereby the one of said foot pegs is rotatable relative to the housing to which said foot peg bracket is connected.

6. The pair of auxiliary lights recited in claim 5, wherein said flange includes a pair of spaced, parallel aligned flange members, the one of said left and right foot pegs being received between said pair of flange members, and a fastener by which the one of said foot pegs is pivotally connected to said foot peg bracket at said pair of flange members thereof.

7. The pair of auxiliary lights recited in claim 1, wherein one of said pair of auxiliary lights also includes a shifter mount bracket connected to said housing, the gear shift pedal of said motorcycle being supported by said housing and coupled to said shifter mount bracket.

8. The pair of auxiliary lights recited in claim 7, wherein the gear shift pedal of said motorcycle is coupled to said shifter mount bracket at needle bearings formed in said shifter mount bracket.

9. The pair of auxiliary lights recited in claim 7, wherein the gear shift pedal of said motorcycle is coupled to said shifter mount bracket at a clear bore formed in said shifter mount bracket.

10. The pair of auxiliary lights recited in claim 7, wherein said shifter mount bracket is detachably connected at a side of said housing.

11. The pair of auxiliary lights recited in claim 10, also including a row of fasteners located along the side of said housing, said shifter mount bracket being detachably connected at the side of said housing by means of at least one fastener from said row of fasteners, such that the position of said shifter mount bracket along the side of said housing is selectively adjustable depending upon the particular fastener from said row of fasteners to detachably connect said shifter mount bracket to said housing.

12. The pair of auxiliary lights recited in claim 11, wherein said at least one fastener from said row of fasteners by which said shifter mount bracket is detachably connected at the side of said housing is longer than the other fasteners from said row of fasteners.

13. The pair of auxiliary lights recited in claim 1, wherein said motorcycle also includes framework at said front end by which to support a motor, said pair of auxiliary lights connected to the opposite sides of said motorcycle at said framework.

14. For a motorcycle having a front end, opposite sides, left and right foot pegs located at said opposite sides and a gear shift pedal located at one of said opposite sides, the improvement comprising:

a pair of auxiliary lights respectively connected to the opposite sides of said motorcycle to provide the motorcycle with a source of lateral illumination, each of said pair of auxiliary lights including a housing, a light bulb enclosed by said housing, and a motorcycle foot peg bracket connected to said housing, said foot peg bracket coupled to one of said left and right foot pegs, whereby the one of said foot pegs is supported by said housing; and a shifter mount bracket connected to the housing of one of said pair of auxiliary lights, said gear shift pedal coupled to said shifter mount bracket and supported by the housing of the one of said pair of auxiliary lights.

* * * * *